(12) United States Patent
Godard (10) Patent No.: US 8,565,924 B2
(45) Date of Patent: Oct. 22, 2013

(54) SCHEDULING METHOD AND SYSTEM FOR SYNCHRONIZATION OF MATERIAL FLOWS IN BATCH PROCESS INDUSTRY

(75) Inventor: Daniel Godard, Antony (FR)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 12/788,336

(22) Filed: May 27, 2010

(65) Prior Publication Data

US 2010/0332007 A1     Dec. 30, 2010

(30) Foreign Application Priority Data

Jun. 26, 2009 (EP) ..................................... 09305607

(51) Int. Cl.
*G06F 19/00* (2011.01)

(52) U.S. Cl.
USPC ............................................ 700/282; 700/99

(58) Field of Classification Search
USPC ........ 700/282, 99, 95, 18, 100, 102, 106–107
See application file for complete search history.

(56) References Cited

U.S. PATENT DOCUMENTS

| | | | |
|---|---|---|---|
| 6,594,535 B1 * | 7/2003 | Costanza | 700/97 |
| 7,426,418 B2 | 9/2008 | Kern | |
| 2003/0172371 A1 | 9/2003 | Offenmuller | |
| 2007/0288112 A1 * | 12/2007 | Knipfer et al. | 700/105 |

* cited by examiner

*Primary Examiner* — Kidest Bahta
(74) *Attorney, Agent, or Firm* — North Shore Patents, P.C.; Michele Liu Baillie (57) ABSTRACT

Method for managing material flows synchronization in a batch manufacturing process including a plurality of activities includes: representing the material flow between each of any two of the connected activities by a pegging arc, where a source activity is supplying at least a portion of an associated quantity of the material to a target activity, where the quantity represents at least a portion of an associated quantity of the material; assigning to each pegging arc an order; following the assigned order, determining, for each pegging arc a speed $C_T$ at which the target activity consumes the material, and a speed $P_T$ at which the source activity produces the material; and according to $C_T$ and $P_T$, determining which portion of a processing time of the production of the material by the source activity is to be dedicated to which portion of a processing time of the target activity.

25 Claims, 8 Drawing Sheets

SCHEDULING METHOD AND SYSTEM FOR SYNCHRONIZATION OF MATERIAL FLOWS IN BATCH PROCESS INDUSTRY

CROSS-REFERENCE TO RELATED APPLICATIONS

The present application relates to, incorporates by reference and claims benefit of the priority date of European Patent Application No. 09305607.5, entitled "A Scheduling Method and system for Synchronization of Material Flows in Batch Process Industry", filed on Jun. 26, 2009.

BACKGROUND

1. Technical Field

The present invention relates to the field of management of supply chain, more particularly of optimization of material flows in the batch process industry.

2. Background of Invention

In batch process industries, one of the key issues that must be well addressed by the scheduling system is its capability to handle the material flow between the different steps of the process. To define the strict relationship between two steps of a manufacturing process, where one of the steps produces as output an intermediate product or a material which is needed as input by the other step, the concept of "pegging" is often used. By using pegging arcs it is possible to define all those parameters (e.g. time and quantity) that rule the relationship between the two steps and related activities.

Traditionally there are two different approaches to the above issue:

- Dynamic Pegging approach. In this approach, the scheduling system takes decisions on the sources and destinations of the material flow, on the quantities and when they are produced and consumed. All these decisions are inter-related and taken at the same time.
- Static Pegging approach. Here the decisions on the sources and destinations of the material flow and the quantities are taken in a first step. Decisions regarding when the quantities are produced and consumed are taken in a second step.

Dynamic Pegging approach is in theory a more advanced solution, however it might lead to models that are extremely hard to solve in a reasonable time. Indeed, the scheduling systems that use Dynamic Pegging are based on heuristics or use a simulation approach. Unfortunately these solving strategies bring poor schedules. For these reasons, the Static Pegging approach is often preferred, in particular when advanced optimization techniques are used.

State of the art scheduling systems that use a Static Pegging approach, normally transform the material flows into simple graph of precedence constraints between producing and consuming serialized activities. These approaches usually bring poor material synchronization when parallelism is possible. As an example, U.S. Pat. No. 7,426,418 discloses a method for supply chain planning by means of pegging arcs. In general, prior art systems which address this issue provide unsatisfactory results when a combination of serial and parallel production and/or consumption is required.

BRIEF SUMMARY

In an embodiment, the present invention provides a method for managing material flows synchronization in a batch manufacturing process, the manufacturing process including a plurality of activities, each activity being connected to at least one other activity, each activity X being associated with a quantity $Q_{XM}$ of a material M and a related processing time $t_X$ during which the quantity $Q_{XM}$ of the material M is processed, the method comprising: representing the material M flow between each of any two connected activities by a pegging arc $e_{ST(M)}$, wherein the source activity S of the connected activities is supplying at least a portion $q_{ST}$ of an associated quantity $Q_{SM}$ of the material M to a target activity T of the connected activities, wherein the target activity T is receiving the quantity $q_{ST}$ from the source activity, wherein the quantity $q_{ST}$ represents at least a portion of an associated quantity $Q_{TM}$ of the material M; assigning to each pegging arc $e_{ST(M)}$ an order; following the assigned order, for each pegging arc $e_{ST(M)}$, determining: a value $C_T$ indicative of a speed at which the target activity T consumes the material M; and a value $P_T$ indicative of a speed at which the source activity S produces the material M; according to the determined values $C_T$ and $P_T$, determining which portion of a processing time $t_s$ of production of the material M by the source activity S is to be dedicated to which portion of a processing time $t_c$ of the target activity T in order to optimize a throughput of the batch manufacturing process.

In an embodiment of the present invention, the method of the present invention determines which kind of supply relationship is better in each particular case: the options according to an embodiment are "parallel" or "serial" material flow between one or more source activities and one or more target activities.

In a further embodiment of the present invention, a system corresponding to the method above is provided.

In another embodiment a computer program product corresponding to the method above is provided.

System and computer program products corresponding to the above-summarized methods are also described and claimed herein.

BRIEF DESCRIPTION OF THE SEVERAL VIEWS OF THE DRAWINGS

Embodiments of the invention will now be described, by way of example only, by reference to the accompanying drawings, in which.

DETAILED DESCRIPTION

Figure 1:
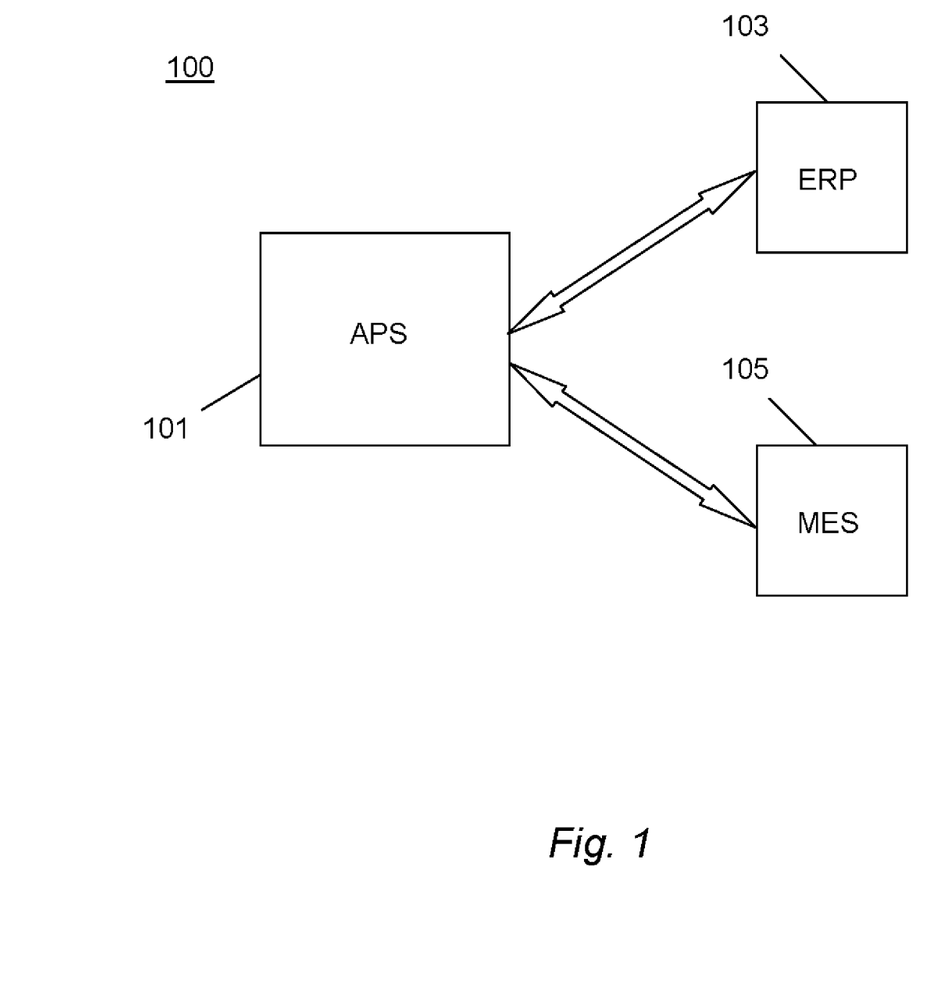
FIG. 1 is an example of an integrated planning and scheduling system for a manufacturing plant to which the scheduling method of the present invention is applied.

FIG. 1 shows a complete integrated manufacturing systems 100 where a planning and scheduling application according to an embodiment of the present invention 101, interacts with an Enterprise Resource Planning (ERP) system 103 (e.g. SAP™ R/3, Oracle™ Applications), which manages the manufacturing data such as the materials, the equipments and the manufacturing process; and a Manufacturing Execution System (MES) 105 (e.g. SiView of International Business Machines Corp™, Rockwell Automation, Siemens Simatic IT™), which executes and monitors the work-in-progress on the factory floor.

Figure 2:
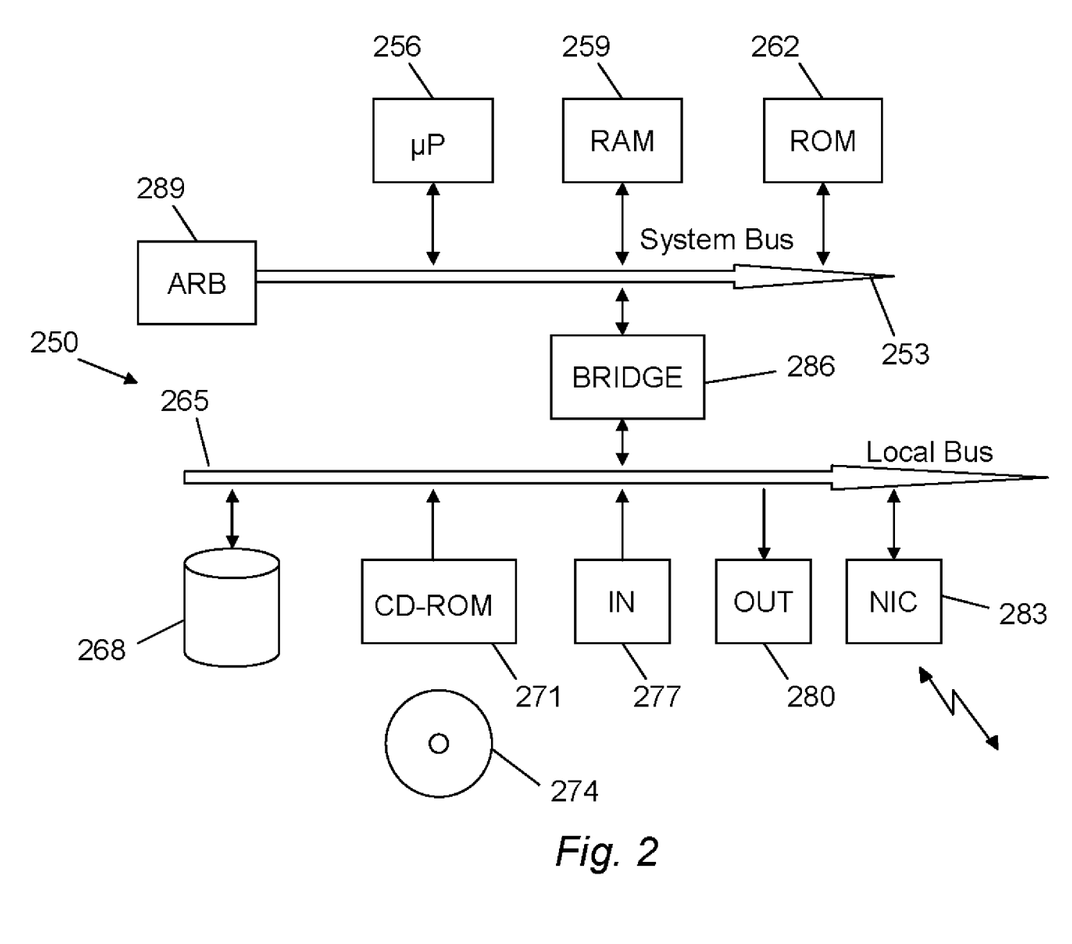
FIG. 2 is a diagram of a general computer system adapted to support the scheduling method of an embodiment of the present invention.

With reference to FIG. 2 a generic computer of the system (e.g. computer, scheduling server, ERP server, MES server) is denoted with 250. The computer 250 is formed by several units that are connected in parallel to a system bus 253. In detail, one or more microprocessors 256 control operation of the computer 250; a RAM 259 is directly used as a working memory by the microprocessors 256, and a ROM 262 stores basic code for a bootstrap of the computer 250. Peripheral units are clustered around a local bus 265 (by means of respective interfaces). Particularly, a mass memory includes a hard-disk 268 and a drive 271 for reading CD-ROMs 274. Moreover, the computer 250 includes input devices 277 (for example, a keyboard and a mouse), and output devices 280 (for example, a monitor and a printer). A Network Interface Card 283 is used to connect the computer 250 to the network. A bridge unit 286 interfaces the system bus 253 with the local bus 265. Each microprocessor 256 and the bridge unit 286 can operate as master agents requesting an access to the system bus 253 for transmitting information. An arbiter 289 manages the granting of the access with mutual exclusion to the system bus 253. Similar considerations apply if the system has a different topology, or it is based on other networks. Alternatively, the computers have a different structure, include equivalent units, or include other data processing entities (such as PDAs, mobile phones, and the like).

Figure 3:
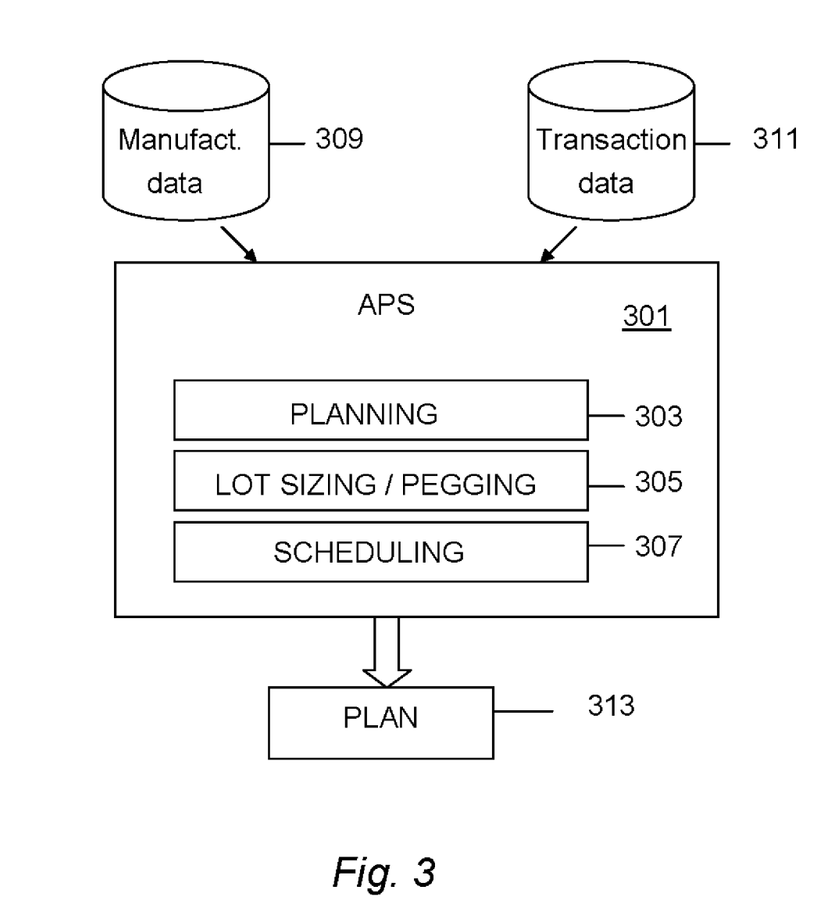
FIG. 3 shows a block diagram of a software architecture of a scheduling system of an embodiment.

Referring now to FIG. 3 a software architecture for implementing the method of an embodiment of the present invention is shown. An Advance Planning and Scheduling System (APS) 301 includes: a Planning module 303 which gives rough estimates on how much and when materials must be produced to meet the demands and the service levels; another module 305 for "Lot-sizing/Pegging", which creates production orders and links upstream and downstream production orders with material flow; and a Scheduling module 307, which determines when these production orders are executed and on which equipment. Scheduler 301 receives data from a Manufacturing database 309 which provides information on materials, equipments, manufacturing process, service levels and from a Transaction database 311 which contains e.g. forecasts, demands, orders and due-dates.

The scheduling method of the present invention can be applied to any kind of industry, however it finds a particular useful implementation in those kind of industries where the stock must be kept at a minimum for both reduction of stock and inventory costs, where upstream and downstream equipments are highly synchronized, where intermediate buffers (e.g. tanks) have limited capacity, and where materials are subject to maturity and shelf-life. Examples of such industries are the food and beverage industry, the fast-moving consumer goods industry, the pharmaceutical and chemical industries. In all these cases it is extremely important to guarantee a precise synchronization between two activities where one of the activities produces as output an intermediate product which is needed as input by the other activity. In such cases it is extremely important that the right quantities of intermediate products are ready as soon as they are needed by the following (in the supply chain) activities. If an activity must wait for another activity, which is an earlier step in the supply chain, to complete, this implies a delay and a potential loss in the production process (reduced throughput). In one aspect of an embodiment of the present invention, a planning and scheduling system aims at avoiding such interruptions in a number of ways, including accurate modeling of the various activities and the related material flows.

Figure 4A:
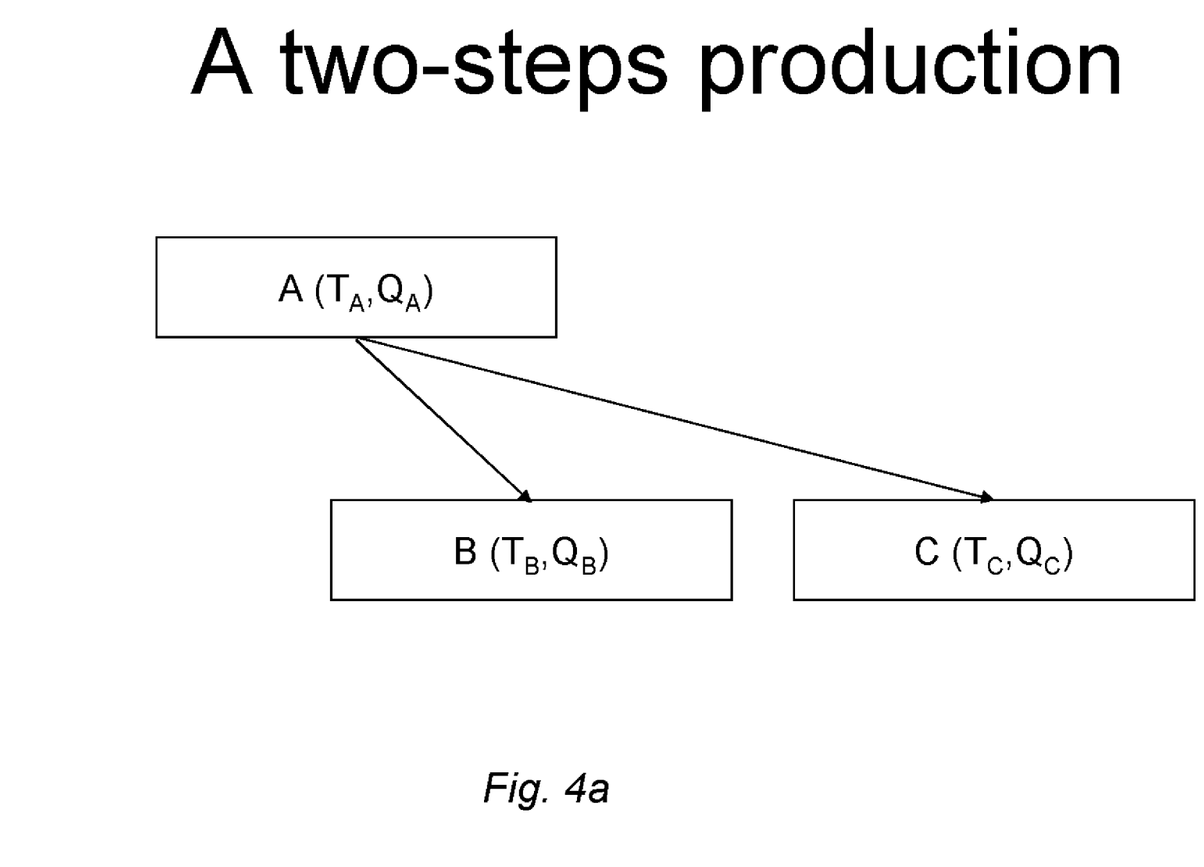
FIGS. 4a-4c are examples of inter-related activities to which the scheduling system of the present invention is applied.
Figure 4B:
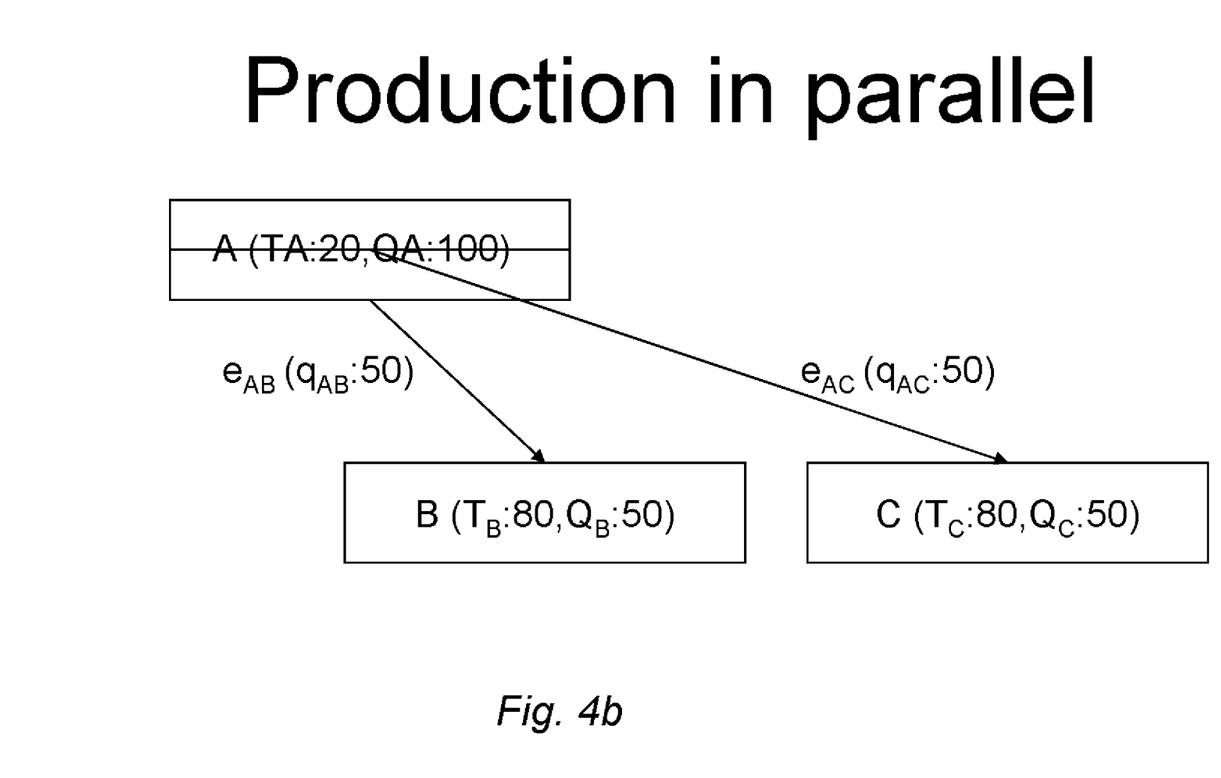
Figure 4C:
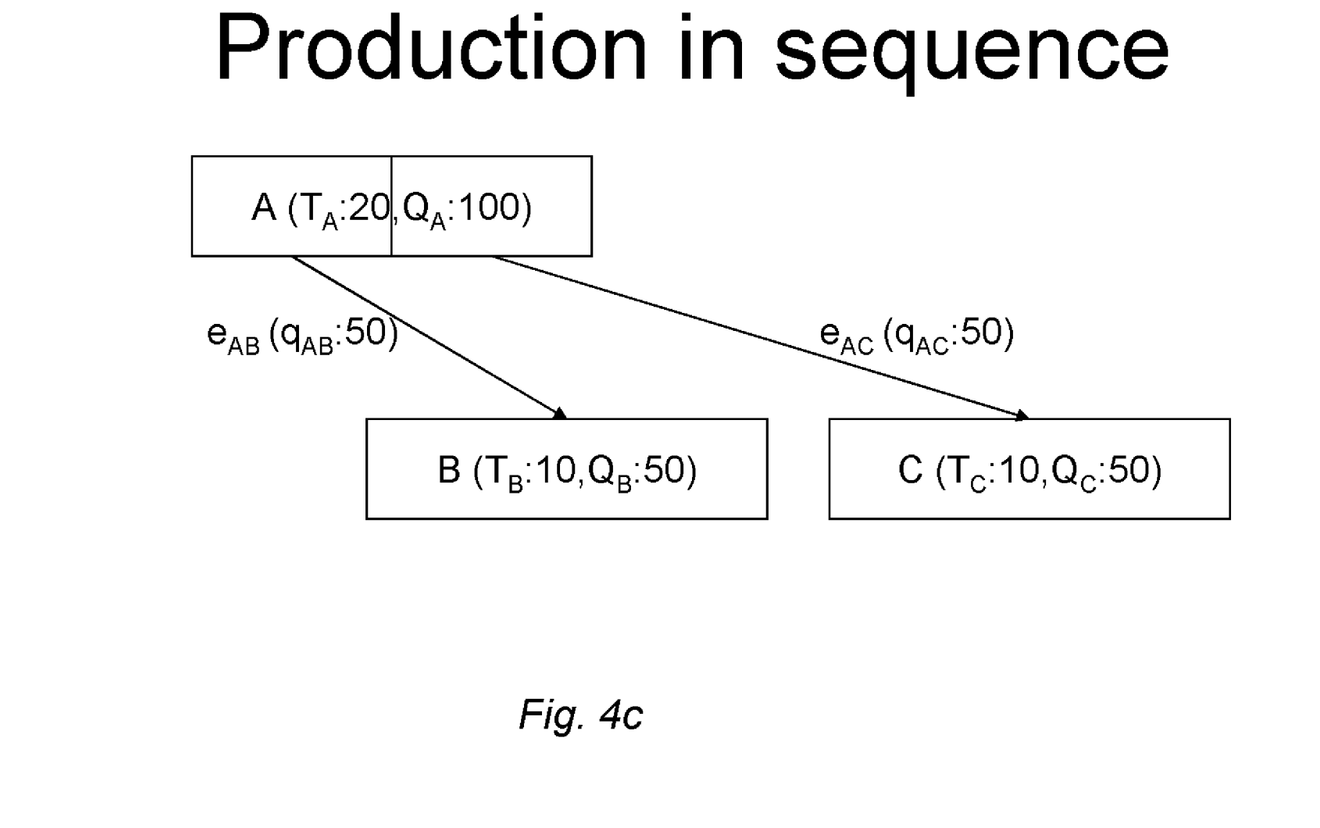

Referring now to FIGS. 4a-4c, aspects of planning and scheduling in connection with production of a fruit flavored yoghurt are depicted, according to an embodiment of the invention. As shown in FIG. 4a, activities A, B and C are considered. Activity A represents the production of the so-called "white mass" (the Material W) which is needed as input by activities B and C where the intermediate product white mass is processed together with the corresponding fruit (e.g. strawberry for A and kiwi for B) to create the final products Strawberry Yoghurt and Kiwi Yoghurt. The example depicted in FIGS. 4a-4c omits consideration that should be done for a precise synchronization of material flow. (A need for precise synchronization arises at least because the white mass for yoghurt has an intermediate step for fermentation.): This synchronization step is not completely taken into account in the present example merely for the sake of simplicity, i.e., in order to present an example that more clearly illustrates other significant issues. However, a synchronization feature is further described herein below, such as in connection with IBM ILOG PPO 3.2™, maturity and shelf-life.

According to an embodiment of the present invention, we assign a value $Q_A$ (referred to Material W) to activity A, indicative of the quantity of Material W which can be produced by activity A, while $Q_B$ and $Q_C$ are respectively the quantity of Material W consumed by activity B and activity C. Also a time $T_A$ indicates the time required by activity A to complete the production of Material W, while $T_B$ and $T_C$ represent the time required by activities B and C to "consume" the required quantity of Material W. Each material flow in the production line can be represented by means of "pegging" arcs from a source activity (A in our example) to one or more target activities (B and C in the present example): the source activity will have an associated time ($T_A$) which is expressed in time units according to a predetermined convention, while the target activities will have an associated time ($T_B$ and $T_C$ in our example) expressed in the same time units. During time $T_A$ a quantity of Material W is produced by source activity A, while in a time $T_B$ (or $T_C$) the target activity B (or C) consumes the necessary quantity of Material W. In the present example a simple relationship among one source activity and two target activities is represented, however those skilled in the art will appreciate that more complex production requirements can be represented in a similar way, considering that each target activity can become a source activity for one or more target activities: as an example the output of activity B can be the input of an activity D (not represented in FIG. 4a). In general the time $T_x$ represents the processing time of Activity X where "processing" can vary according to the activity. The material flow described in the present example is a continuous flow, but those skilled in the art will appreciate that the same process can be applied to "discrete" material flow (as an example we could think of chemical reactor where the material produced by the reactor is available once the complete batch has been processed in the reactor). In any case each material flow can be represented by means of a pegging arc between a source and a target activity, where the source activity has an associated produced quantity $Q_s$ in a production time $T_s$ and the target activity has an associated consumption quantity $Q_t$ and a related consumption time $T_t$.

The method according to an embodiment of the present invention determines which kind of supply relationship is better in each particular case: the options according to an embodiment are "parallel" or "serial" material flow between one or more source activities and one or more target activities.

For the sake of simplicity in the present example we consider the case of one source activity supplying material to a plurality (two) of targets, however all combinations mentioned above are possible. With "parallel" material supply we mean that the production of material by the source activity is supplied in parallel to more than one target activity, while with "serial" we mean that the source activity feeds the plurality of targets in sequence. In the example represented in FIG. 4b we assume that the quantity $Q_A$ of Material W (the White mass) produced by activity A is =100, while the quantity $Q_B$ and $Q_C$ of Material W needed by B and C is =50 (each). The time $T_A$ required by activity A to produce the quantity $Q_A$ is 20, while the time of activity B for consuming the required quantity $Q_B$ of Material W is 80. It is therefore clear that the speed of production of activity A is much higher than the speed of consumption of activity B. For this reason there is no need for activity B to have the exclusive production of activity A reserved for its need, because the quantity of Material W produced in the time unit is higher than the quantity which can be consumed by B, so that the Material W produced by A can be supplied in parallel to both B and C.

If on the contrary, as shown in FIG. 4c, the speed at which activity B consumes Material W is higher than or equal to the production speed of activity A, it is advisable to reserve the whole production of activity A to the needs of activity B. In the example of FIG. 4c time $t_A$ is still 20, but time $t_B$ is 10, i.e. activity B has a speed of consumption which is equal to the speed of production of activity A. In such case it is better to first dedicate the whole production of activity A to activity B, otherwise activity B would be delayed. In the present example we did not consider the requirement of activity C, because according to an embodiment of the present invention the analysis of the pegging arcs (hence of the activities) is done according to a chronological order, i.e. we first evaluate the needs of the target activity having a lower order (in terms of time). However those skilled in the art will appreciate that other parameters could be used instead, e.g. we could assign to each pegging arc (indicative of an activity) a priority weight which determines in which order the single activities are evaluated, or even organizing a more complex process where more than one pegging arc at a time is taken into consideration. In an embodiment of the present invention, as described in the following examples, we have used a heuristic to determine the various parameters, however those skilled in the art will appreciate that other solutions are possible, e.g. an optimization model to determine all or some of the parameters.

Figure 5:
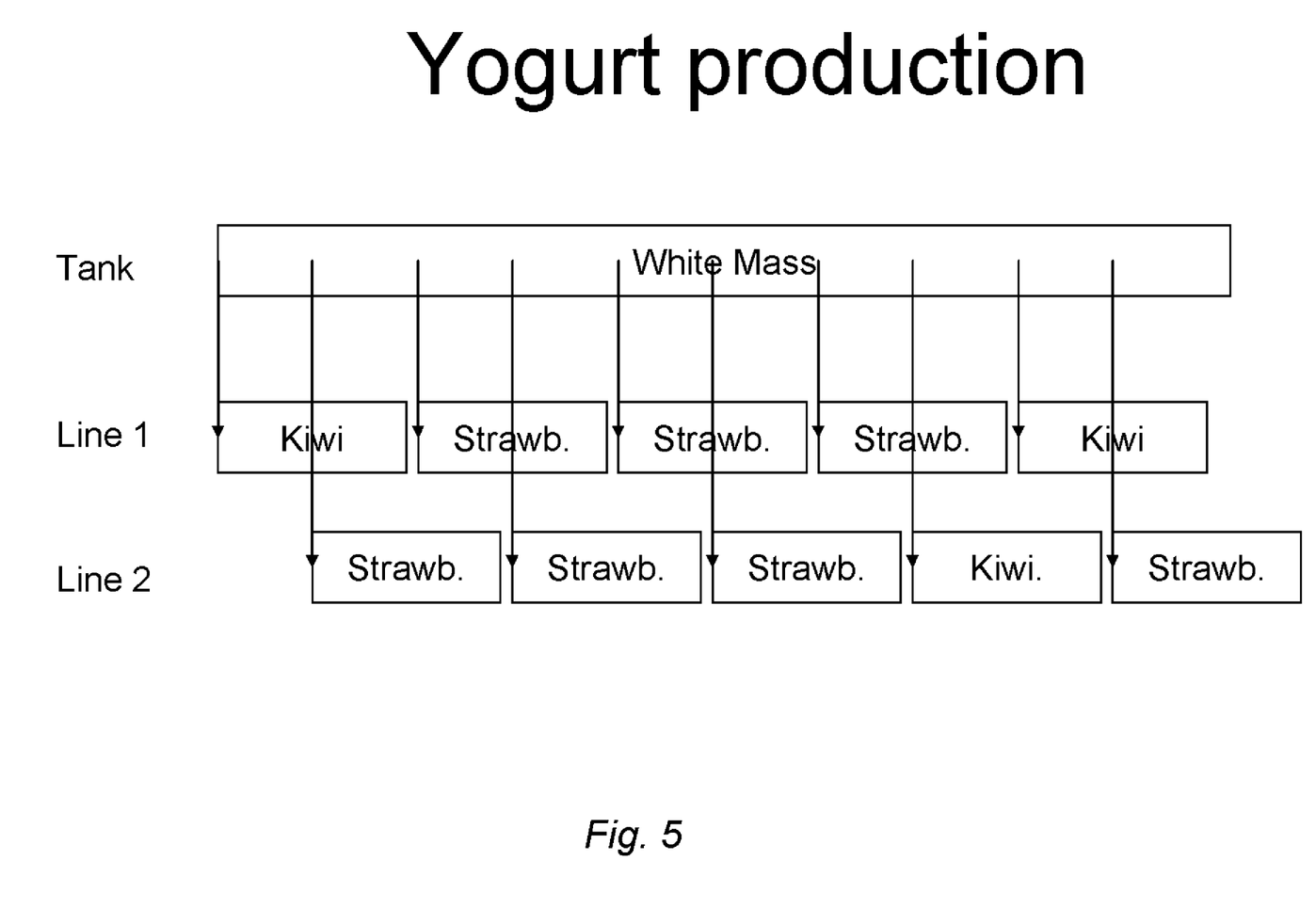
FIG. 5 is a schematic example of the user interface for operating the system according to an embodiment of the present invention.

According to an embodiment of the present invention the scheduling and planning system is implemented in IBM ILOG Plant PowerOps 3.2™, an integrated planning and scheduling tool specifically designed for a fast-moving consumer goods, for computing scheduling solutions and for interactive and dynamic rescheduling. In an embodiment of the present invention, a user interface provides the possibility of modifying all input values in an easy and intuitive way, e.g. by allowing moving deadlines and activities by drag and drop actions; in this way also the chain of precedence relationships is modified. FIG. 5 shows an example of the "yogurt" case described above with the activities and the corresponding time relationships: the "Tank" line correspond to activity A of the example producing the white mass, while "Line 1" and "Line 2" represents Activity B and C. By e.g. dragging the first kiwi box and moving to a later time (i.e. to the right) the administrator can change the precedence order among the activities, so that the first strawberry box of the Activity C becomes the first activity to consume the white mass by source Activity A. Also the user interface according to an embodiment of the present invention is configured in order to raise alerts, e.g. in case of material shortage or in case maturity of a material or shelf-life limits are violated.

In an embodiment of the present invention we consider the following inputs to the system:

a set of materials M a set of non-preemptive activities A. Activities can be interrupted by breaks. Furthermore, activities can be subject to a calendar of productivity. Each activity is associated with a processing time that represents the time required to execute the activity if there is no break nor productivity calendar;

a directed graph G=(A,E) where the nodes are the activities and the edges are the material flow between the activities that produce a given material m∈M and the activities that consume this material;

for each activity a∈A and for each material m∈M, the quantity produced or consumed q(a, m)∈Z of material m by the activity a is given: if the quantity is produced then $q(a, m) \in Z^+$, otherwise $q(a, m) \in Z^-$;

for each arc e∈E, the following information is given: the material m(e)∈M and the quantity $q(e) \in Z^+$ of material m(e) that transit between the activity that produces the material and the activity that consumes the material;

Let:

a be an activity;

IncomingArcs(a, m) be the set of incoming arcs with material m.

OutgoingArcs(a,m) be the set of outgoing arcs with material m.

predecessor(e) the tail of the arc e that is the activity that produces the material m(e).

successor(e) the head of the arc e that is the activity that consumes the material m(e).

We assume that the following equations always hold:

$$\forall a \in A, \forall m \in M;$$
$$\sum_{e \in OutgoingArcs(a,m)} q(e) = q(a, m) \quad \sum_{e \in IncomingArcs(a,m)} q(e) = |q(a, m)|$$

Introducing Start and End Coefficients

To each material flow arc e four parameters are associated:

$\alpha_p(e) \in [0 \ldots 1]$: which represents the start time of production of material m(e) for the arc e by the activity predecessor(e). It is expressed in percentage of the processing time of the activity predecessor(e);

$\beta_p(e) \in [0 \ldots 1]$: which represents the end time of production of material m(e) for the arc e by the activity predecessor(e). It is expressed in percentage of the processing time of the activity predecessor(e);

$\alpha_c(e) \in [0 \ldots 1]$: which represents the start time of consumption of material m(e) for the arc e by the activity successor(e). It is expressed in percentage of the processing time of the activity successor(e);

$\beta_c(e) \in [0 \ldots 1]$: which represents the end time of the consumption of the material m(e) for the arc e by the activity successor(e). It is expressed in percentage of the processing time of the activity successor(e).

A purpose of these four parameters is to be able to compute the start time and the end time of the production and the start time and the end time of the consumption for a given material flow arc. We will see later in the description how to choose values for these four parameters.

Let:
pst(e) be the start time of the production interval of material m(e) for arc e;
pet(e) be the end time of the production interval of material m(e) for arc e;
cst(e) be the start time of the consumption interval of material m(e) for arc e;
cet(e) be the end time of the consumption interval of material m(e) for arc e.

We will see below how pst(e), pet(e), cst(e) and cet(e) are related to the start times of the predecessor and successor activities and the parameters $\alpha_p$, $\beta_p$, $\alpha_c$, $\beta_c$.

Let:
s(a) be the start time of the activity a;
pt(a) be the processing time of the activity a.

Typically s(a) is unknown, its value is determined by the scheduling module.

Activities can be interrupted by breaks. For instance if an activity has a processing time of 3 hours, starts at 10 am, has a break from 12 am to 1 pm, then it ends at 2 pm: its duration is 4 hours.

Activities can also be subject to a productivity calendar. For instance, if an activity has a processing time of 3 hours, starts at 10 am, has a productivity of 50% up to 12 am and 100% after, then the activity ends at 2 pm.

Let $g_a$: Z→Z be a function associated with activity a that converts a time expressed in nominal time units to true time units. If there is no break nor productivity, $g_a \equiv I$.

The following equations define the relationships between the start times and the end times of the production interval and the consumption interval for an arc e and the start times of the activity that produces the material and the activity that consumes the material:

$\forall e \in E$, a=predecessor(e), b=successor(e);

$pst(e) = g_a(\lfloor \alpha_p(e) * pt(a) + g_a^{-1}(s(a)) \rfloor)$ $pet(e) = g_a(\lceil \beta_p(e) * pt(a) + g_a^{-1}(s(a)) \rceil)$ $cst(e) = g_b(\lfloor \alpha_c(e) * pt(b) + g_a^{-1}(s(b)) \rfloor)$ $cet(e) = g_b(\lceil \beta_c(e) * pt(b) + g_a^{-1}(s(b)) \rceil)$ The first two equations define respectively the start time and the end time of the production interval: it is a sub-interval of the predecessor of arc e that is the activity that produces the material. The last two equations define respectively the start time and the end time of the consumption interval: it is a sub-interval of the successor of arc e that is the activity that consumes the material.

Enforcing No Material Shortage

"No material shortage" is enforced by the following equations:

$\forall e \in E$;

pst(e)≤cst(e)

pet(e)≤cet(a)

These equations ensure that consumption of a given material m does not occur before it has been produced.

More precisely, the first equation enforces that the start time of the consumption interval is greater than or equal to the start time of the production interval. The second equation enforces that the end time of the consumption interval is greater than or equal to the end time of the production interval.

Enforcing Maturity and Shelf-Life

Maturity of a material m is the minimum length of time that must occurs after it has been produced and before it can be consumed. The shelf-life is the maximum length of time before the material is considered unsuitable for use.

Let:
maturity(m)$\in Z^+$ be the maturity of material m.
shelflife(m)$\in Z^+$ be the shelf life of material m.

$\forall e \in E$;

maturity(m(e))≤cst(e)−pst(e)≤shelflife(m(e))

maturity(m(e))≤cet(a)−pet(e)≤shelflife(m(e))

The first equation enforces that the start time of the consumption interval is greater than or equal to the start time of the production interval plus the maturity. The first equation also enforces that the start time of the consumption interval is less than or equal to the start time of the production interval minus the shelf-life. The second equation enforces that the end time of the consumption interval is greater than or equal to the end time of the production interval plus the maturity. The second equation also enforces that the end time of the consumption interval is less than or equal to the end time of the production interval minus the shelf-life.

The equations described above, as implemented in an embodiment of the present invention (e.g. IBM ILOG PowerOps 3.2™), allow a higher accuracy in the management of material flows and of the sequence of activity start and end points. This is also very useful to check consistency of the overall plan when modifications of some of the parameters (e.g. quantity, time, capacity) are requested by a user, e.g. through the user interface. Also it is possible to associate an alert when some of the rules are violated. These constraints could be advantageously applied also in different environment where a complex inter-relationship among several activities must be monitored and managed.

Case where Refilling Storage Tanks is not Allowed

There are various cases in the batch process industries where it is not allowed to refill a storage tank before it has been emptied such as to ensure traceability, to enforce quality or to avoid contamination. A typical model for forbidding storage tanks to be refilled contains the following additional entities:
a renewable resource r of capacity 1;
a storage activity associated to each activity that produces a given material in the storage tank.

Let:
storageActivity(a) be the storage activity associated to activity a. Its duration is unknown and can be null.
OutgoingArcs(a,m) be the set of outgoing arcs of activity a and material m.

The storage activity and its associated activity are related with the following equations:

$\forall a \in A, \forall m \in M, q(a,m) > 0;$ $\begin{cases} s(storageActivity(a)) = e(a) \\ e(storageActivity(a)) = \text{Max}_{e \in OutgoingArcs(a,m)}\{cet(e)\} \end{cases}$ Both the activity a and activity storageActivity(a) use the renewable resource r: this prevents any other activity filling the associated storage tank to occur from the start time of the activity a to the end time of the activity storageActivity(a).

Computing Start and End Coefficients

An heuristic based approach is applied to compute the four coefficients. In case the production is discrete, the material is produced at the end of the activity, then $\alpha_p(e)=1$ and $\beta_p(e)=1$. In case the consumption is discrete, the material is consumed at the beginning of the activity, then $\alpha_c(e)=0$ and $\beta_c(e)=0$.

In the remaining part of this section, we will assume production and consumption are continuous.

The heuristic described below aims at building compact schedules and maximizing throughput. It assumes a current scheduling solution is available. If no scheduling solution is available, an estimate of the earliest start times of the activities is used instead.

The heuristic decides for each material flow arc, taken in chronological order of the start times of the activities that consume the material (as a tie-break, the start times of the activities that produces the material are used), what are the values of the four coefficients by selecting the production rate and the consumption rate for this arc.

Let:
rq(a, m)$\in R^+$ be the remaining quantity available of material m by activity a; initially rq(a,m)=|q(a, m)|
$\alpha_{min}(a, m) \in R \cap [0 \ldots 1]$ be the smallest possible value for the start coefficient; initially $\alpha_{min}(a, m)=0$ For any material arc e, the values for coefficients $\alpha_c(e)$ and $\beta_c(e)$ must fulfill the following equations:

$$\begin{cases} \frac{q(e)}{(1-\alpha_{min}(successor(e), m(e)))*\mathrm{pt}(a)} \leq \frac{q(e)}{(\beta_c(e)-\alpha_c(e))*\mathrm{pt}(a)} \\ \frac{q(e)}{(\beta_c(e)-\alpha_c(e))*\mathrm{pt}(a)} \leq \frac{rq(a,m)}{(1-\alpha_{min}(successor(e), m(e)))*\mathrm{pt}(a)} \end{cases}$$

The first equation enforces a minimum consumption rate for the arc e and the second equation enforces a maximum consumption rate for the arc e. As there are many possible values for $\alpha_c(e)$ and $\beta_c(e)$ that fulfills the above equations, the heuristic will choose the values among these two extreme cases: either choose the maximum consumption rate or the minimum consumption rate.

If the maximum consumption rate is chosen, then $\alpha_c(e)$ and $\beta_c(e)$ are computed as follows:

$$\alpha_c(e) \leftarrow \alpha_{min}(successor(e), m(e))$$

$$\beta_c(e) \leftarrow \alpha_c(e) + (1-\alpha_c(e)) * \frac{q(e)}{rq(succcessor(e), m(e))}$$

$$\alpha_{min}(succcessor(e), m(e)) \leftarrow \beta_c(e)$$

$$rq(successor(e), m(e)) \leftarrow rq(successor(e), m(e)) - q(e)$$

If the minimum consumption rate is chosen, then $\alpha_c(e)$ and $\beta_c(e)$ are computed as follow:

$$\alpha_c(e) \leftarrow \alpha_{min}(successor(e), m(e)) \quad \beta_c(e) \leftarrow 1$$

$$rq(successor(e), m(e)) \leftarrow rq(successor(e), m(e)) - q(e)$$

There are similar formulas for $\alpha_p(e)$ and $\beta_p(e)$.
The heuristic proceeds as follow:
it selects an arc e;
if the maximum production rate is lower than the minimum consumption rate, then the maximum production rate and the minimum consumption rate are chosen for arc e;

if the maximum consumption rate is lower than the minimum production rate then the maximum consumption rate and the minimum production rate are chosen for arc e;

in any other case, the maximum production rate and the maximum consumption rate are chosen for arc e;

this process is iterated until all arcs have been selected.

Applying the algorithm above to the example shown in FIG. 4b we have the following values:

$q_{AB}=50$
$T_B=80$
$T_A=20$
$q_{AB}/T_B=0.626$ (consumption rate)
$q_{AB}/T_A=2.5$ (lowest production rate)
$q_{AB}/T_B <= q_{AB}/T_A$ then lowest production rate for A and arc $e_{AB}$ is the best option. This means that a "parallel" material supply is to be preferred to the "serial" one because the target activity cannot consume all the material produced by the source.

On the contrary, with the case represented in FIG. 4c we have:

$q_{AB}=50$
$T_B=10$
$T_A=20$
$q_{AB}/T_B=5$ (consumption rate)
$Q_A/T_A=5$ (highest production rate)
$Q_A/T_A <= q_{AB}/T_B$ then highest production rate for A and arc $e_{AB}$ is the best option. This means that a "serial" material supply is to be preferred to the "parallel" one because the target activity needs the full capacity of the source activity otherwise it would be delayed.

Figure 6:
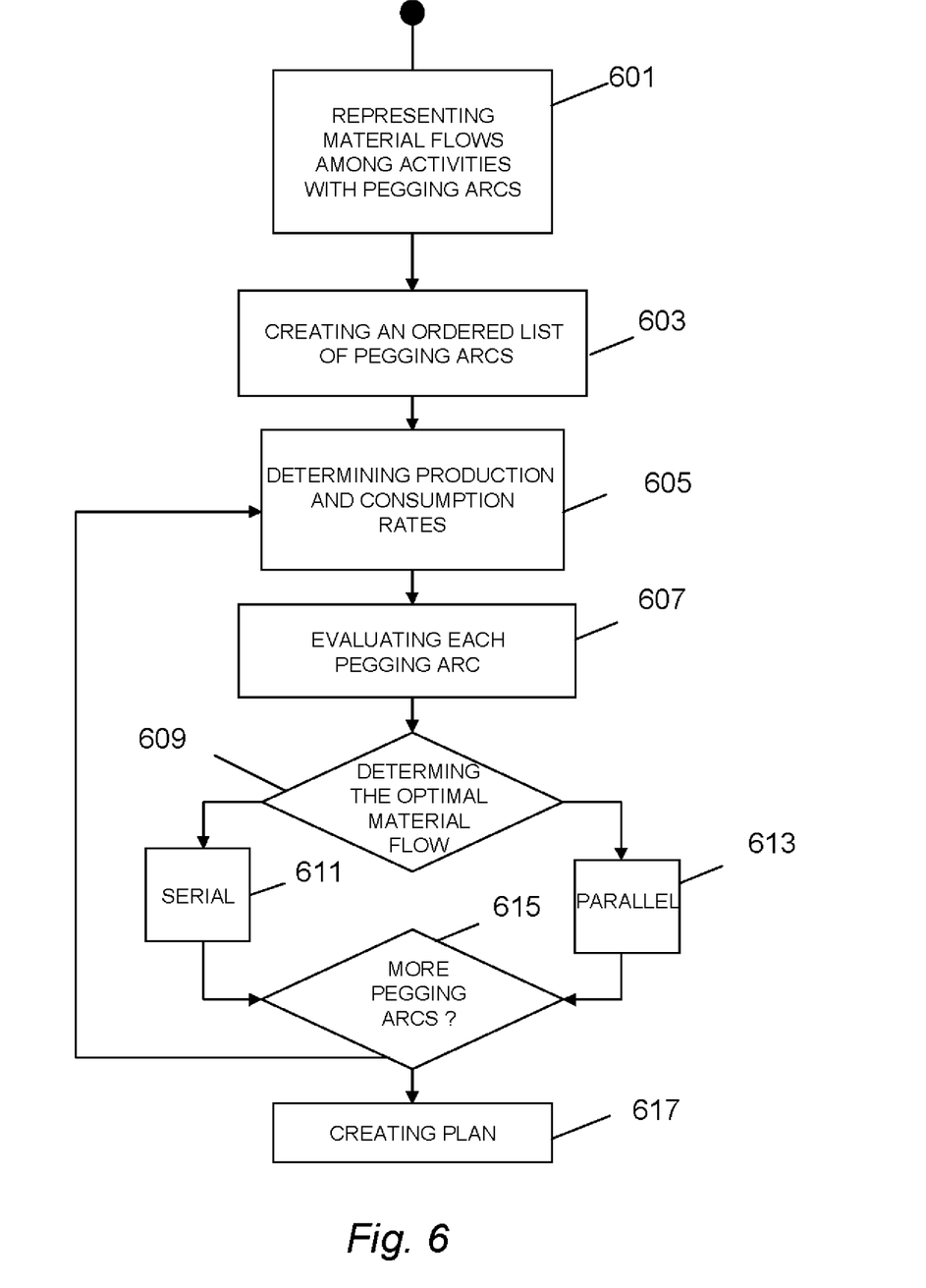
FIG. 6 shows a flowchart representing a method according to an embodiment of the present invention.

FIG. 6 schematically shows method steps according to an embodiment of the present invention (600). The process starts at step 601 where all the relationships between two activities are represented by means of pegging arc $e_{ST(M)}$: each pegging arc will link a source activity S and a target activity T; the source activity S supplies at least a portion $q_{ST}$ of an associated quantity $Q_{SM}$ of material M to the target activity T and the activity T receives the quantity $q_{ST}$ representing at least a portion of its associated quantity $Q_{TM}$ of material M from source activity S. Control then goes to step 603 where to each pegging arc it is assigned an order (e.g. chronological or priority or a combination or both). This step of assigning an order to the pegging arcs could be anticipated before the step 601 or even integrated in the same step. As mentioned above a user interface is provided in an embodiment of the present invention to allow modifications and amendments to the order in which the activities must be executed: these changes will have an effect on the priority order of the pegging arcs. Also it is possible that the order is later automatically modified if the results of the scheduling plan are not satisfactory. Then at step 605 the min and max consumption and production rates are determined as explained above and at step 607 for each pegging arc it is determined the best material flow according to the parameters described above. According to the decision 609 the material flow can be either "parallel" or "serial" as explained above or a combination of the two, even if in FIG. 6 only "serial" (611) and "parallel" (613) options are represented. These determining steps are then repeated, following the order above, until all pegging arcs are evaluated (step 615). At the end a Scheduling Plan is created (617). As mentioned above, it is possible that additional tools for ensuring the optimal scheduling are implemented (not shown in the FIG. 6), e.g. a simulation could be done with different parameters to find the optimal priority order to assign to the pegging arcs.

The teachings herein above enable, among other things, flexibility in scheduling system improve material flows among a plurality of activities, particularly in case of complex relationships among the activities. Alterations and modifications may be made to the above without departing from the scope of the invention. Naturally, in order to satisfy local and specific requirements, a person skilled in the art may apply to the solution described above many modifications and alterations. Particularly, although the present invention has been described with a certain degree of particularity with reference to embodiment(s) thereof, which include one or more preferred embodiments, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computers have different structure or include equivalent units; in any case, it is possible to replace the computers with any code execution entity (such as a PDA, a mobile phone, and the like).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with, an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibres, wireless connections, networks, broadcast waves, and the like; for example, the medium may be of the electronic, magnetic, optical, electromagnetic, infrared, or semiconductor type.

Some types of the computer readable medium referred to herein above may be referred to as "computer readable signal medium," while other types may be referred to as "computer readable storage medium." To clarify, computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc. or any suitable combination of the foregoing.

In any case, a solution according to the present invention lends itself to be carried out with a hardware structure (for example, integrated in a chip of semiconductor material), or with a combination of software and hardware.

What is claimed is:

1. A method for managing material flows synchronization in a batch manufacturing process, the batch manufacturing process including a plurality of activities, each activity being connected to at least one other activity, each activity X being associated with a quantity $Q_{XM}$ of a material M and a related processing time $t_X$ during which the quantity $Q_{XM}$ of the material M is processed, comprising:

representing the material M flow between each of any two of the connected activities by a pegging arc $e_{ST(M)}$, wherein a source activity S of the connected activities is supplying at least a portion $q_{ST}$ of an associated quantity $Q_{SM}$ of the material M to a target activity T of the connected activities, wherein the target activity T is receiving the quantity $q_{ST}$ from the source activity S, wherein the quantity $q_{ST}$ represents at least a portion of an associated quantity $Q_{TM}$ of the material M;

assigning to each pegging arc $e_{ST(M)}$ an order;

following the assigned order, determining, for each pegging arc $e_{ST(M)}$:
 a value $C_T$ indicative of a speed at which the target activity T consumes the material M; and
 a value $P_T$ indicative of a speed at which the source activity S produces the material M; and according to the determined values $C_T$ and $P_T$, determining, by a processor, which portion of a processing time $t_s$ of the production of the material M by the source activity S is to be dedicated to which portion of a processing time $t_t$ of the target activity T in order to optimize a throughput of the batch manufacturing process.

2. The method of claim 1 further comprising:

in response to the value $C_T$ being greater or equal to the value $P_T$, dedicating a full production of the material M by the source activity S to the target activity T before supplying the material M to any other of the plurality of activities connected with the source activity S.

3. The method of claim 1, wherein the determining for each pegging arc $e_{ST(M)}$ the value $C_T$ indicative of the speed at which the target activity T consumes the material M and the value $P_T$ indicative of the speed at which the source activity S produces the material M comprises:

determining a minimum consumption rate $MinC_T$ of the target activity T, indicative of a speed at which the target activity T consumes the quantity $q_{ST}$ in a time $t_T$;

determining a maximum consumption rate $MaxC_T$ of the target activity T, indicative of a speed at which the target activity T consumes the quantity $Q_{TM}$ in the time $t_T$;

determining a minimum production rate $MinP_T$ of the source activity S, indicative of a speed at which the source activity S produces the quantity $q_{ST}$ in a time $t_S$;

determining a maximum production rate $\text{MaxP}_T$ of the source activity 5, indicative of a speed at which the source activity S produces the quantity $Q_{SM}$ in the time $t_S$;

in response to the $\text{MaxP}_T$ being lower than the $\text{MinC}_T$, selecting the $\text{MaxP}_T$ to be the $P_T$ and selecting the $\text{MinC}_T$ the to be the $C_T$ for the pegging are $e_{ST(M)}$;

in response to the $\text{MaxC}_T$ being lower than the $\text{MinP}_T$, selecting the $\text{MaxC}_T$ to be the $C_T$ and selecting the $\text{MinP}_T$ to be the $P_T$ for the pegging arc $e_{ST(M)}$;

otherwise, selecting the $\text{MaxP}_T$ to be the $P_T$ and selecting the $\text{MaxC}_T$ to be the $C_T$ for the pegging arc $e_{ST(M)}$.

4. The method of claim 1, wherein the determining for each pegging arc $e_{ST(M)}$ the value $C_T$ indicative of the speed at which the target activity T consumes the material M and the value $P_T$ indicative of the speed at which the source activity S produces the material M is done by using a heuristic.

5. The method of claim 1, wherein the determining for each pegging arc $e_{ST(M)}$ the value of $C_T$ indicative of the speed at which the target activity T consumes the material M and the value of $P_T$ indicative of the speed at which the source activity S produces the material M is done by using an optimization algorithm.

6. The method of claim 1, wherein the assigning to each pegging arc $e_{ST(M)}$ the order is done using a heuristic.

7. The method of claim 1, wherein the assigning to each pegging arc $e_{ST(M)}$ the order is done using an optimization algorithm.

8. The method of claim 1 further comprising:
creating a scheduling plan for an execution of the plurality of activities.

9. The method of claim 8 further comprising:
comparing the created scheduling plan with expected results;
in response to the expected results not being reached, modifying the pegging arcs order and repeating the determining of the value $C_T$ indicative of the speed at which the target activity T consumes the material M and the value $P_T$ indicative of the speed at which the source activity S produces the material M, and the determining of which portion of the processing time $t_s$ of the production of the material M by the source activity S is to be dedicated to which portion of the processing time $t_t$ of the target activity T in order to optimize the throughput of the batch manufacturing process.

10. The method of claim 8 further comprising:
comparing the created scheduling plan with expected results;
in response to the expected results not being reached, modifying input parameters for determining the $C_T$ and $P_T$ values and repeating the determining of the value $C_T$ indicative of the speed at which the target activity T consumes the material M and the value $P_T$ indicative of the speed at which the source activity S produces the material M, and the determining of which portion of the processing time $t_s$ of the production of the material M by the source activity S is to be dedicated to which portion of the processing time $t_t$ of the target activity T in order to optimize the throughput of the batch manufacturing process.

11. A computer program product for managing material flows synchronization in a batch manufacturing process, the batch manufacturing process including a plurality of activities, each activity being connected to at least one other activity, each activity X being associated with a quantity $Q_{XM}$ of a material M and a related processing time $t_X$ during which the quantity $Q_{XM}$ of the material M is processed, the computer program product comprising:

a computer readable storage memory having computer readable program code embodied therewith, the computer readable program code configured to:

represent the material M flow between each of any two of the connected activities by a pegging arc $e_{ST(M)}$, wherein a source activity S of the connected activities is supplying at least a portion $q_{ST}$ of an associated quantity $Q_{SM}$ of the material M to a target activity T of the connected activities, wherein the target activity T is receiving the quantity $q_{ST}$ from the source activity S, wherein the quantity $q_{ST}$ represents at least a portion of an associated quantity $Q_{TM}$ of the material M;

assign to each pegging arc $e_{ST(M)}$ an order;

following the assigned order, determine, for each pegging arc $e_{ST(M)}$:

a value $C_T$ indicative of a speed at which the target activity T consumes the material M; and a value $P_T$ indicative of a speed at which the source activity S produces the material M; and according to the determined values $C_T$ and $P_T$, determine which portion of a processing time $t_s$ of the production of the material M by the source activity S is to be dedicated to which portion of a processing time $t_t$ of the target activity T in order to optimize a throughput of the batch manufacturing process.

12. The computer program product of claim 11, wherein the computer readable program code is further configured to:
in response to the value $C_T$ being greater or equal to the value $P_T$, dedicate a full production of the material M by the source activity S to the target activity T before supplying the material M to any other of the plurality of activities connected with the source activity S.

13. The computer program product of claim 11, wherein the computer readable program code configured to determine for each pegging arc $e_{ST(M)}$ the value $C_T$ indicative of the speed at which the target activity T consumes the material M and the value $P_T$ indicative of the speed at which the source activity S produces the material M is further configured to:

determine a minimum consumption rate $\text{MinC}_T$ of the target activity T, indicative of a speed at which the target activity T consumes the quantity $q_{ST}$ in a time $t_T$;

determine a maximum consumption rate $\text{MaxC}_T$ of the target activity T, indicative of a speed at which the target activity T consumes the quantity $Q_{TM}$ in the time $t_T$;

determine a minimum production rate $\text{MinP}_T$ of the source activity S, indicative of a speed at which the source activity S produces the quantity $q_{ST}$ in a time $t_S$;

determine a maximum production rate $\text{MaxP}_T$ of the source activity S, indicative of a speed at which the source activity S produces the quantity $Q_{SM}$ in the time $t_S$;

in response to the $\text{MaxP}_T$ being lower than the $\text{MinC}_T$, select the $\text{MaxP}_T$ to be the $P_T$ and select the $\text{MinC}_T$ to be the $C_T$ for the pegging arc $e_{ST(M)}$;

in response to the $\text{MaxC}_T$ being lower than the $\text{MinP}_T$, select the $\text{MaxC}_T$ to be the $C_T$ and select the $\text{MinP}_T$ to be the $P_T$ for the pegging arc $e_{ST(M)}$;

otherwise, select the $\text{MaxP}_T$ to be the $P_T$ and select the $\text{MaxC}_T$ to be the $C_T$ for the pegging arc $e_{ST(M)}$.

14. The computer program product of claim 11, wherein the computer readable program code is further configured to:
create a scheduling plan for an execution of the plurality of activities.

15. The computer program product of claim 14, wherein the computer readable program code is further configured to:

compare the created scheduling plan with expected results;
in response to the expected results not being reached, modify the pegging arcs order and repeat the determining of the value $C_T$ indicative of the speed at which the target activity T consumes the material M and the value $P_T$ indicative of the speed at which the source activity S produces the material M, and the determining of which portion of the processing time $t_s$ of the production of the material M by the source activity S is to be dedicated to which portion of the processing time $t_t$ of the target activity T in order to optimize the throughput of the batch manufacturing process.

16. The computer program product of claim 14, wherein the computer readable program code is further configured to:
compare the created scheduling plan with expected results;
in response to the expected results not being reached, modify input parameters for determining the $C_T$ and $P_T$ values and repeat the determining of the value $C_T$ indicative of the speed at which the target activity T consumes the material M and the value $P_T$ indicative of the speed at which the source activity S produces the material M, and the determining of which portion of the processing time $t_s$ of the production of the material M by the source activity S is to be dedicated to which portion of the processing time $t_t$ of the target activity T in order to optimize the throughput of the batch manufacturing process.

17. A system, comprising:
a database system comprising information on a batch manufacturing process, the batch manufacturing process comprising a plurality of activities, each activity being connected to at least one other activity, each activity X being associated with a quantity $Q_{XM}$ of a material M and a related processing time $t_X$ during which the quantity $Q_{XM}$ of the material M is processed; and
a computer comprising a computer readable storage memory having computer readable program code embodied therewith, the computer readable program code configured to:
represent the material M flow between each of any two of the connected activities by a pegging arc $e_{ST(M)}$, wherein a source activity S of the connected activities is supplying at least a portion $q_{ST}$ of an associated quantity $Q_{SM}$ of the material M to a target activity T of the connected activities, wherein the target activity T is receiving the quantity $q_{ST}$ from the source activity S, wherein the quantity $q_{ST}$ represents at least a portion of an associated quantity $Q_{TM}$ of the material M;
assign to each pegging arc $e_{ST(M)}$ an order;
following the assigned order, determine, for each pegging arc $e_{ST(M)}$:
a value $C_T$ indicative of a speed at which the target activity T consumes the material M; and
a value $P_T$ indicative of a speed at which the source activity S produces the material M; and
according to the determined values $C_T$ and $P_T$, determine which portion of a processing time $t_s$ of the production of the material M by the source activity S is to be dedicated to which portion of a processing time $t_t$ of the target activity T in order to optimize a throughput of the batch manufacturing process.

18. The system of claim 17, wherein the computer readable program code is further configured to:
in response to the value $C_T$ being greater or equal to the value $P_T$, dedicate a full production of the material M by the source activity S to the target activity T before supplying the material M to any other of the plurality of activities connected with the source activity S.

19. The system of claim 17, wherein the computer readable program code configured to determine for each pegging arc $e_{ST(M)}$ the value $C_T$ indicative of the speed at which the target activity T consumes the material M and the value $P_T$ indicative of the speed at which the source activity S produces the material M is further configured to:
determine a minimum consumption rate $MinC_T$ of the target activity T, indicative of a speed at which the target activity T consumes the quantity $q_{ST}$ in a time $t_T$;
determine a maximum consumption rate $MaxC_T$ of the target activity T, indicative of a speed at which the target activity T consumes the quantity $Q_{TM}$ in the time $t_T$;
determine a minimum production rate $MinP_T$ of the source activity S, indicative of a speed at which the source activity S produces the quantity $q_{ST}$ in a time $t_s$;
determine a maximum production rate $MaxP_T$ of the source activity S, indicative of a speed at which the source activity S produces the quantity $Q_{SM}$ in the time $t_s$;
in response to the $MaxP_T$ being lower than the $MinC_T$, select the $MaxP_T$ to be the $P_T$ and select the $MinC_T$ to be the $C_T$ for the pegging arc $e_{ST(M)}$;
in response to the $MaxC_T$ being lower than the $MinP_T$, select the $MaxC_T$ to be the $C_T$ and select the $MinP_T$ to be the $P_T$ for the pegging arc $e_{ST(M)}$;
otherwise, select the $MaxP_T$ to be the $P_T$ and select the $MaxC_T$ to be the $C_T$ for the pegging arc $e_{ST(M)}$.

20. The system of claim 17, wherein the computer readable program code is further configured to:
create a scheduling plan for an execution of the plurality of activities.

21. The system of claim 20, wherein the computer readable program code is further configured to:
compare the created scheduling plan with expected results;
in response to the expected results not being reached, modify the pegging arcs order and repeat the determining of the value $C_T$ indicative of the speed at which the target activity T consumes the material M and the value $P_T$ indicative of the speed at which the source activity S produces the material M, and the determining of which portion of the processing time $t_s$ of the production of the material M by the source activity S is to be dedicated to which portion of the processing time $t_t$ of the target activity T in order to optimize the throughput of the batch manufacturing process.

22. The system of claim 20, wherein the computer readable program code is further configured to:
compare the created scheduling plan with expected results;
in response to the expected results not being reached, modify input parameters for determining the $C_T$ and $P_T$ values and repeat the determining of the value $C_T$ indicative of the speed at which the target activity T consumes the material M and the value $P_T$ indicative of the speed at which the source activity S produces the material M, and the determining of which portion of the processing time $t_s$ of the production of the material M by the source activity S is to be dedicated to which portion of the processing time $t_t$ of the target activity T in order to optimize the throughput of the batch manufacturing process.

23. A method for managing material flows synchronization in a batch manufacturing process, the manufacturing process including a plurality of activities, each activity being connected to at least one other activity, each activity X being associated with a quantity $Q_{XM}$ of a material M and a related processing time $t_X$ during which the quantity $Q_{XM}$ of the material M is processed, comprising:
- representing the material M flow between each of any two of the connected activities by a pegging arc $e_{ST(M)}$, wherein a source activity S of the connected activities is supplying at least a portion $q_{ST}$ of an associated quantity $Q_{SM}$ of the material M to a target activity T of the connected activities, wherein the target activity T is receiving the quantity $q_{ST}$ from the source activity S, wherein the quantity $q_{ST}$ represents at least a portion of an associated quantity $Q_{TM}$ of the material M;
- assigning to each pegging arc $e_{ST(M)}$ an order;
- following the assigned order, determining, for each pegging arc $e_{ST(M)}$:
  - a value $C_T$ indicative of a speed at which the target activity T consumes the material M; and
  - a value $P_T$ indicative of a speed at which the source activity S produces the material M;
- according to the determined, by a processory, values $C_T$ and $P_T$, determining which portion of a processing time $t_s$ of the production of the material M by the source activity S is to be dedicated to which portion of a processing time $t_t$ of the target activity T in order to optimize a throughput of the batch manufacturing process; and
- in response to the value $C_T$ being greater or equal to the value $P_T$, dedicating a full production of the material M by the source activity S to the target activity T before supplying the material M to any other of the plurality of activities connected with the source activity S.

24. The method of claim 23, wherein the determining for each pegging arc $e_{ST(M)}$ the value $C_T$ indicative of the speed at which the target activity T consumes the material M and the value $P_T$ indicative of the speed at which the source activity S produces the material M comprises:
- determining a minimum consumption rate $MinC_T$ of the target activity T, indicative of a speed at which the target activity T consumes the quantity $q_{ST}$ in a time $t_T$;
- determining a maximum consumption rate $MaxC_T$ of the target activity T, indicative of a speed at which the target activity T consumes the quantity $Q_{TM}$ in the time $t_T$;
- determining a minimum production rate $MinP_T$ of the source activity S, indicative of a speed at which the source activity S produces the quantity $q_{ST}$ in a time $t_S$;
- determining a maximum production rate $MaxP_T$ of the source activity S, indicative of a speed at which the source activity S produces the quantity $Q_{SM}$ in the time $t_S$;
- in response to the $MaxP_T$ being lower than the $MinC_T$, selecting the $MaxP_T$ to be the $P_T$ and selecting the $MinC_T$ the to be the $C_T$ for the pegging arc $e_{ST(M)}$;
- in response to the $MaxC_T$ being lower than the $MinP_T$, selecting the $MaxC_T$ to be the $C_T$ and selecting the $MinP_T$ to be the $P_T$ for the pegging arc $e_{ST(M)}$;
- otherwise, selecting the $MaxP_T$ to be the $P_T$ and selecting the $MaxC_T$ to be the $C_T$ for the pegging arc $e_{ST(m)}$.

25. The method of claim 23, further comprising:
creating a scheduling plan for an execution of the plurality of activities.

* * * * *